(12) United States Patent
Boivin et al.

(10) Patent No.: US 6,234,264 B1
(45) Date of Patent: May 22, 2001

(54) SNOWMOBILE SUSPENSION SYSTEM

(75) Inventors: Alain Boivin, St-Henry de Lévis; Denis Boivin, La Pocatiére, both of (CA)

(73) Assignee: A & D Boivin Design, St. Henri de Lévis (CA)

( * ) Notice: Subject to any disclaimer, the term of this patent is extended or adjusted under 35 U.S.C. 154(b) by 0 days.

(21) Appl. No.: 09/198,582

(22) Filed: Nov. 24, 1998

(51) Int. Cl.$^7$ .................................................. B62M 27/02
(52) U.S. Cl. ............................................................ 180/193
(58) Field of Search ..................... 180/193, 9.1, 9.5, 180/9.52, 9.54, 9.58; 280/28

(56) References Cited

U.S. PATENT DOCUMENTS

| | | | |
|---|---|---|---|
| 3,719,242 | * 3/1973 | Duclo | 180/5 R |
| 3,913,692 | * 10/1975 | Lohr et al. | 180/5 R |
| 4,987,965 | * 1/1991 | Bourret | 180/193 |
| 5,265,692 | 11/1993 | Mallette . | |
| 5,301,965 | * 4/1994 | Floreani | 280/600 |
| 5,370,198 | 12/1994 | Karpik . | |
| 5,667,031 | 9/1997 | Karpik . | |
| 5,692,579 | 12/1997 | Peppel et al. . | |
| 5,730,242 | 3/1998 | Furusawa . | |
| 5,836,594 | * 11/1998 | Simmons | 280/28 |
| 5,860,486 | * 1/1999 | Boivin et al. | 180/193 |

* cited by examiner

*Primary Examiner*—Brian L. Johnson
*Assistant Examiner*—Tony Winner
(74) *Attorney, Agent, or Firm*—Goudreau Gage Dubuc

(57) ABSTRACT

A snowmobile suspension system used to suspend the drive belt of a snowmobile between extended and retracted position is described herein. The snowmobile suspension system is provided with a pair of side rails to guide the drive belt, a pair of suspension arms each having a proximate end pivotally mounted to the snowmobile and a distal end pivotally mounted to both side rails, shock absorbers and compression springs provided between the side rails and the snowmobile to bias the side rails towards their extended position, and a progressive spring assembly mounted to the side rails to prevent forceful contact between the side rails and the undersurface of the snowmobile. The side rails are advantageously made of composite material and present a concave undersurface. The pivotal attachment of the distal end of the rear suspension arm to the side rails is advantageously made via an adjustable cam assembly allowing the user to modify the characteristics of the snowmobile suspension system.

13 Claims, 8 Drawing Sheets

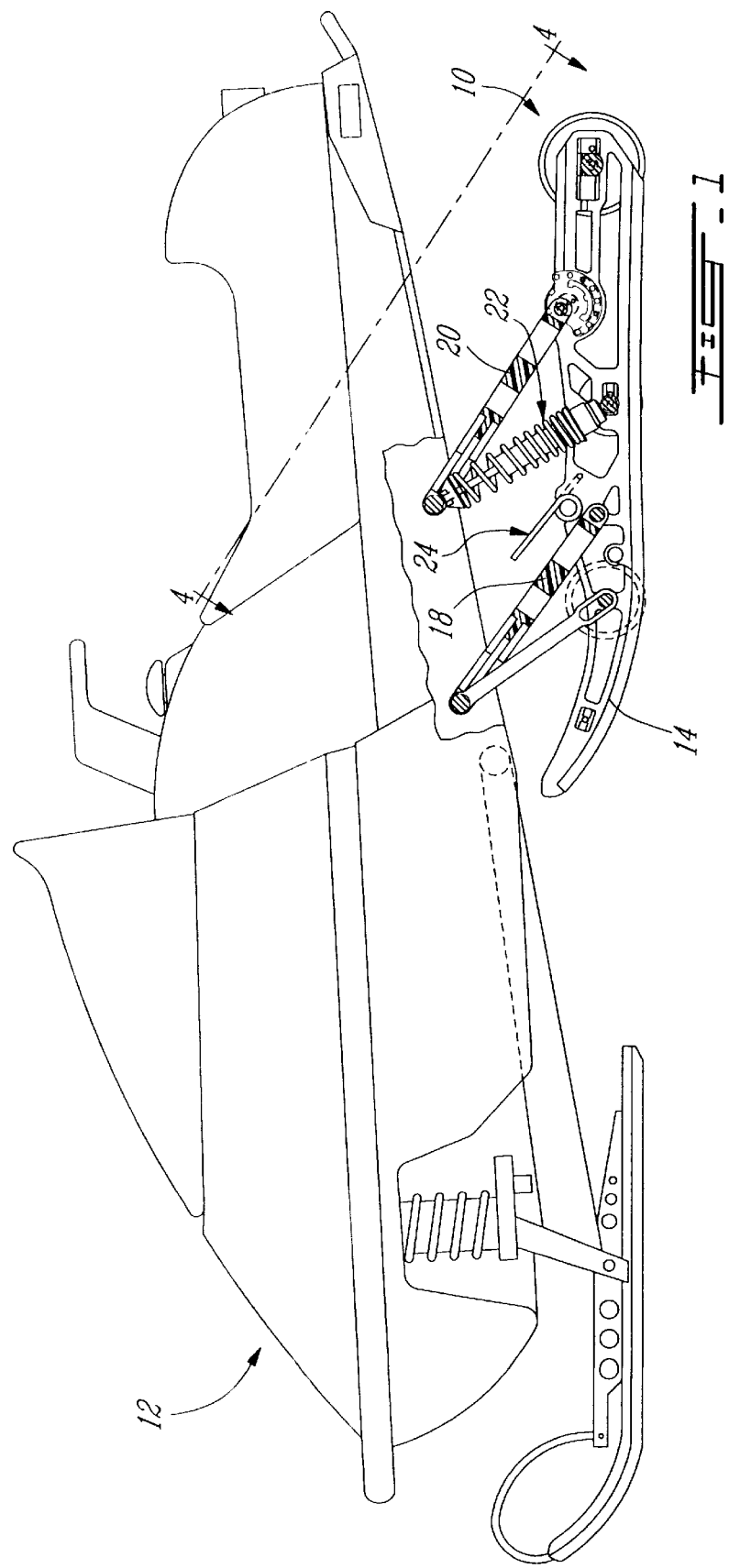

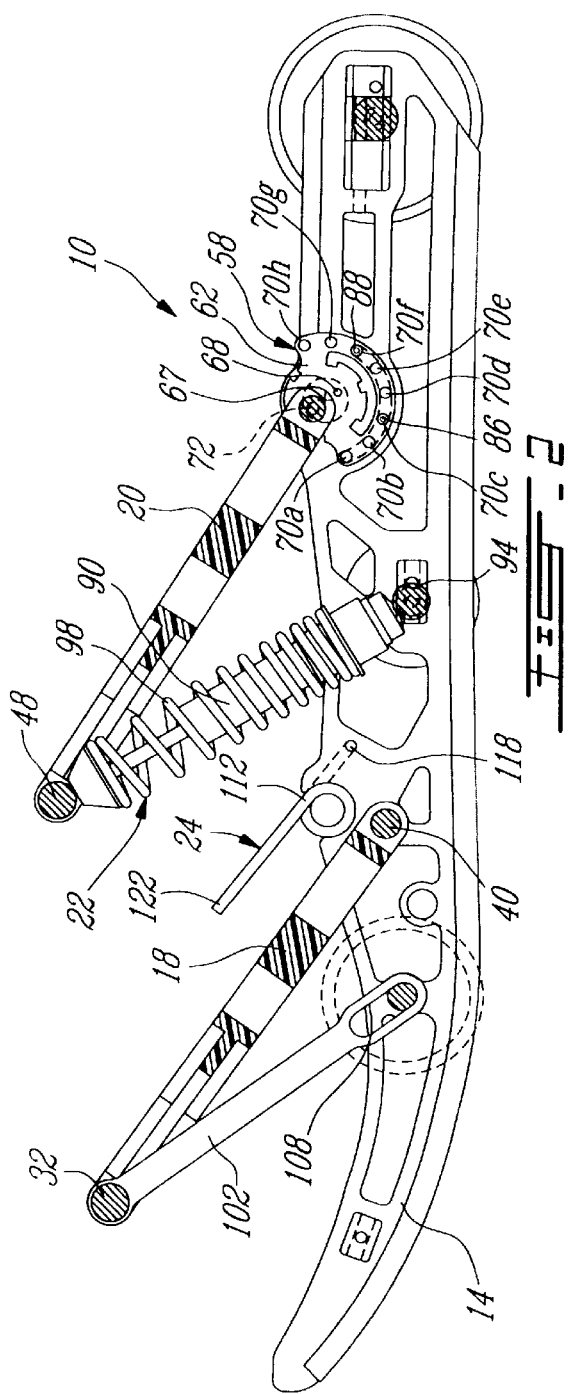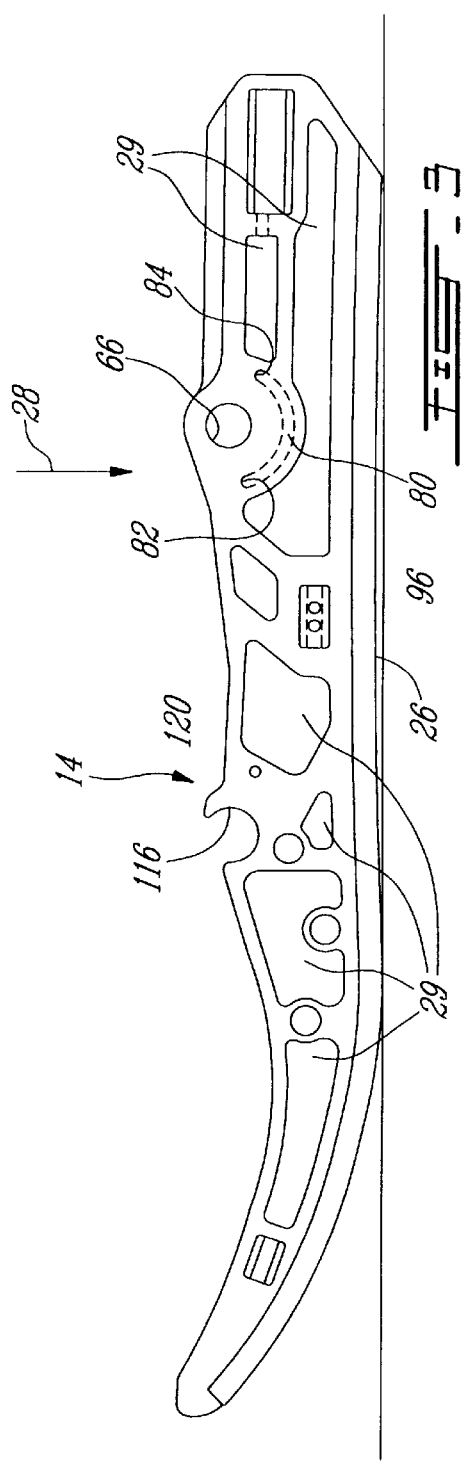

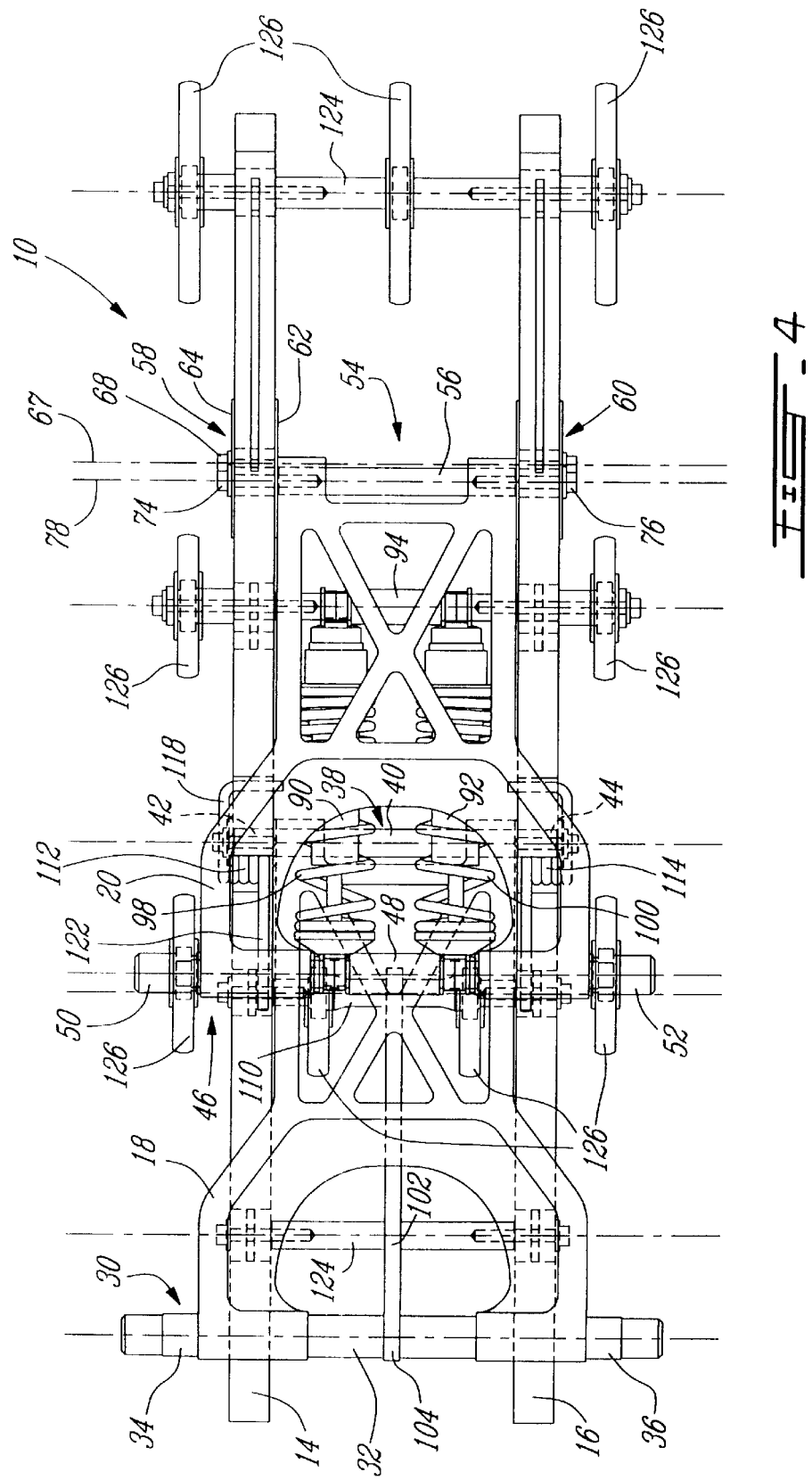

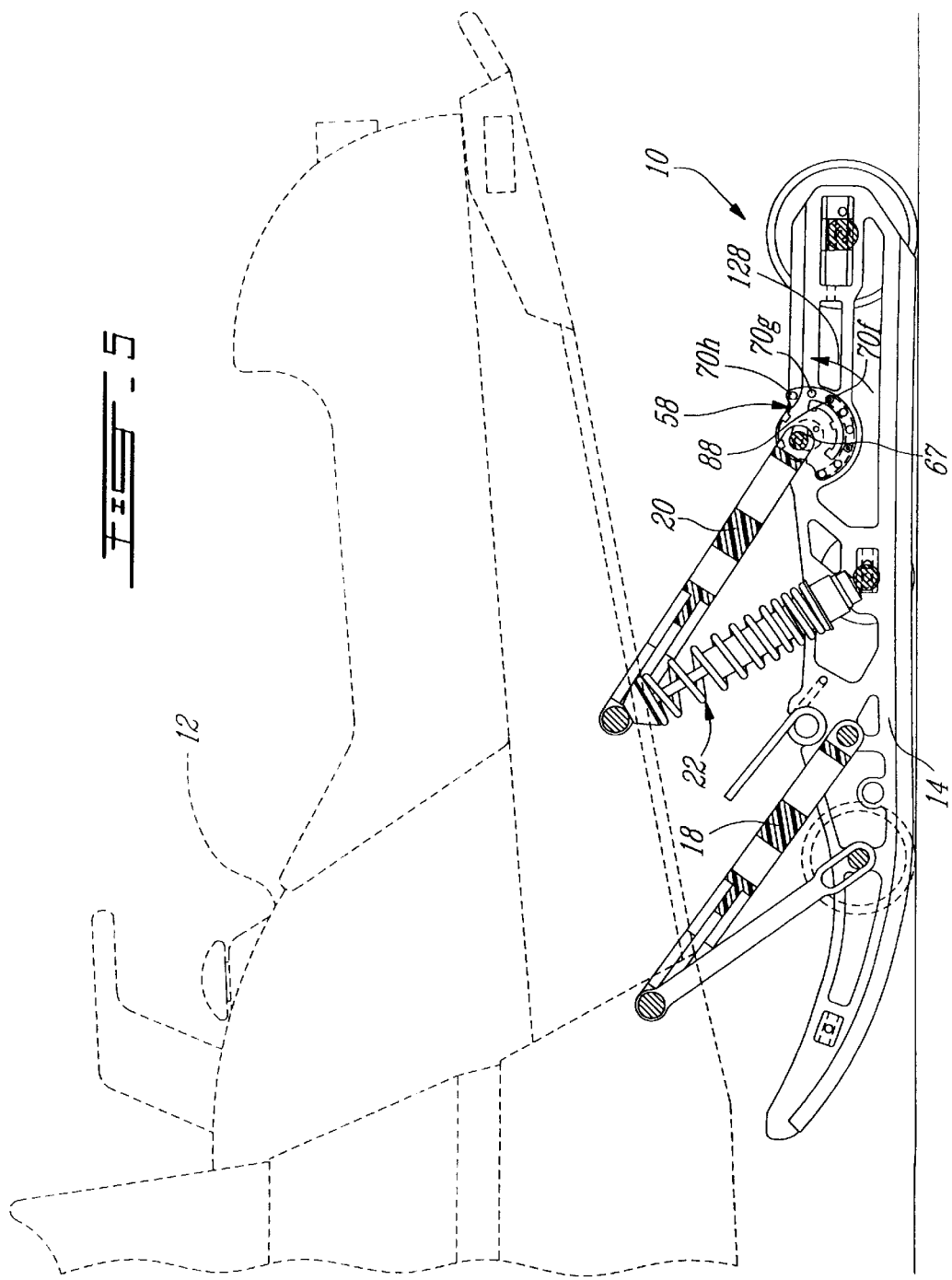

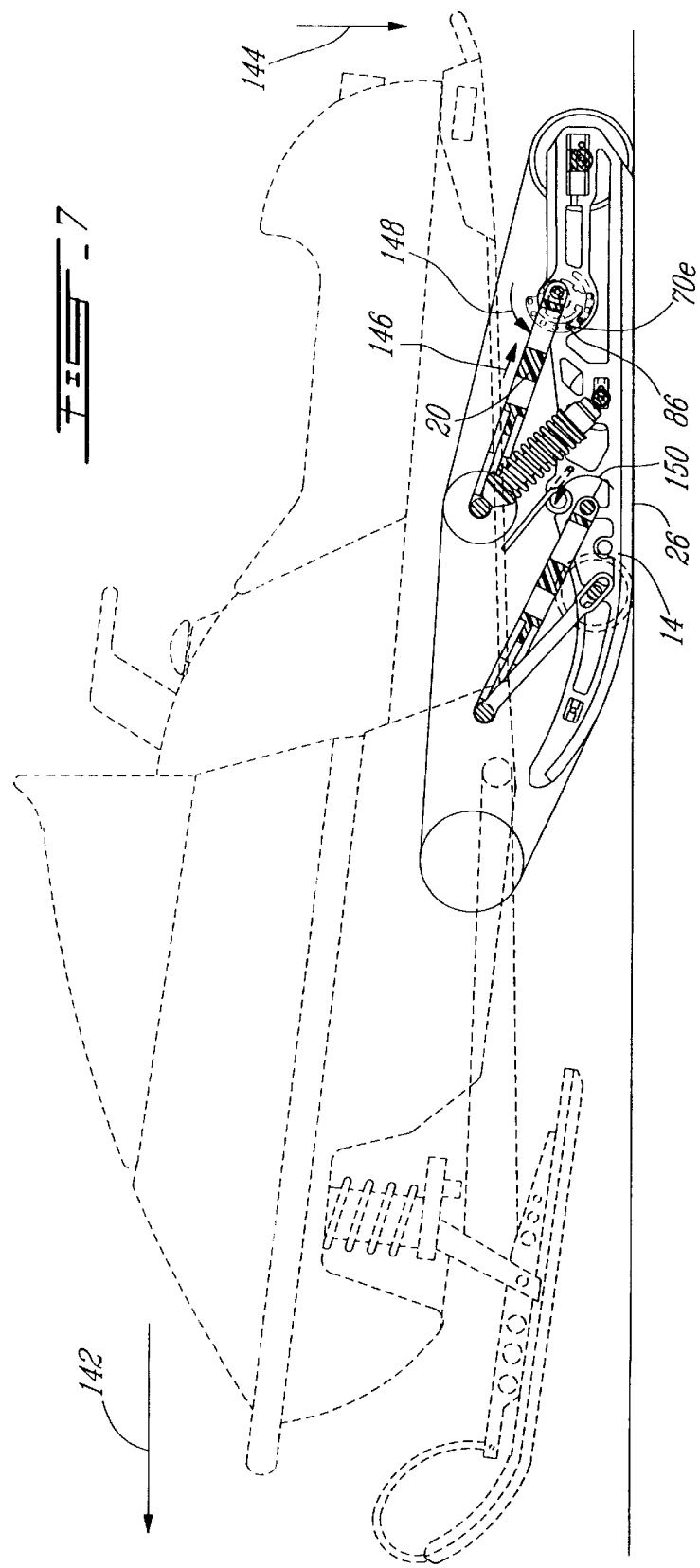

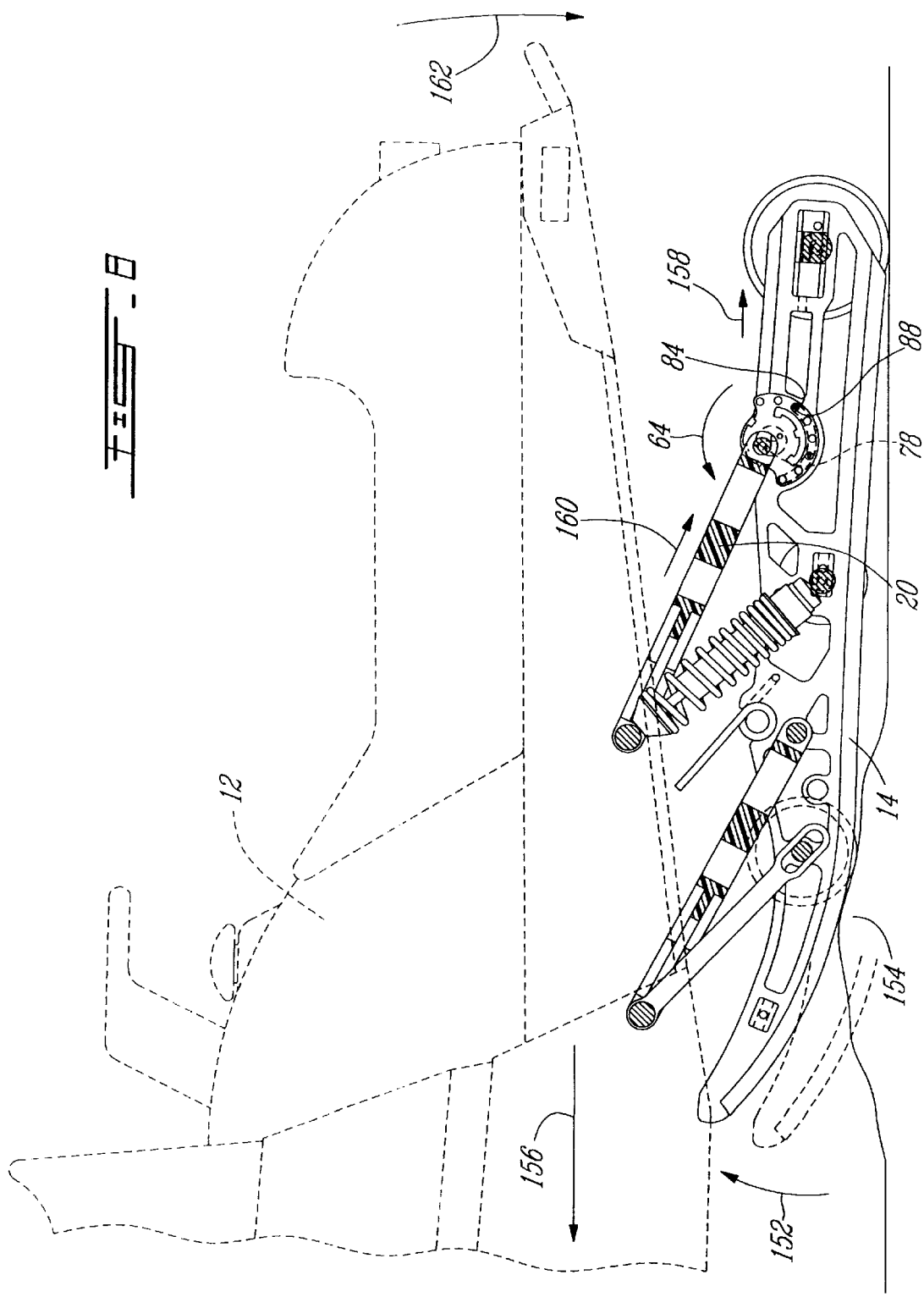

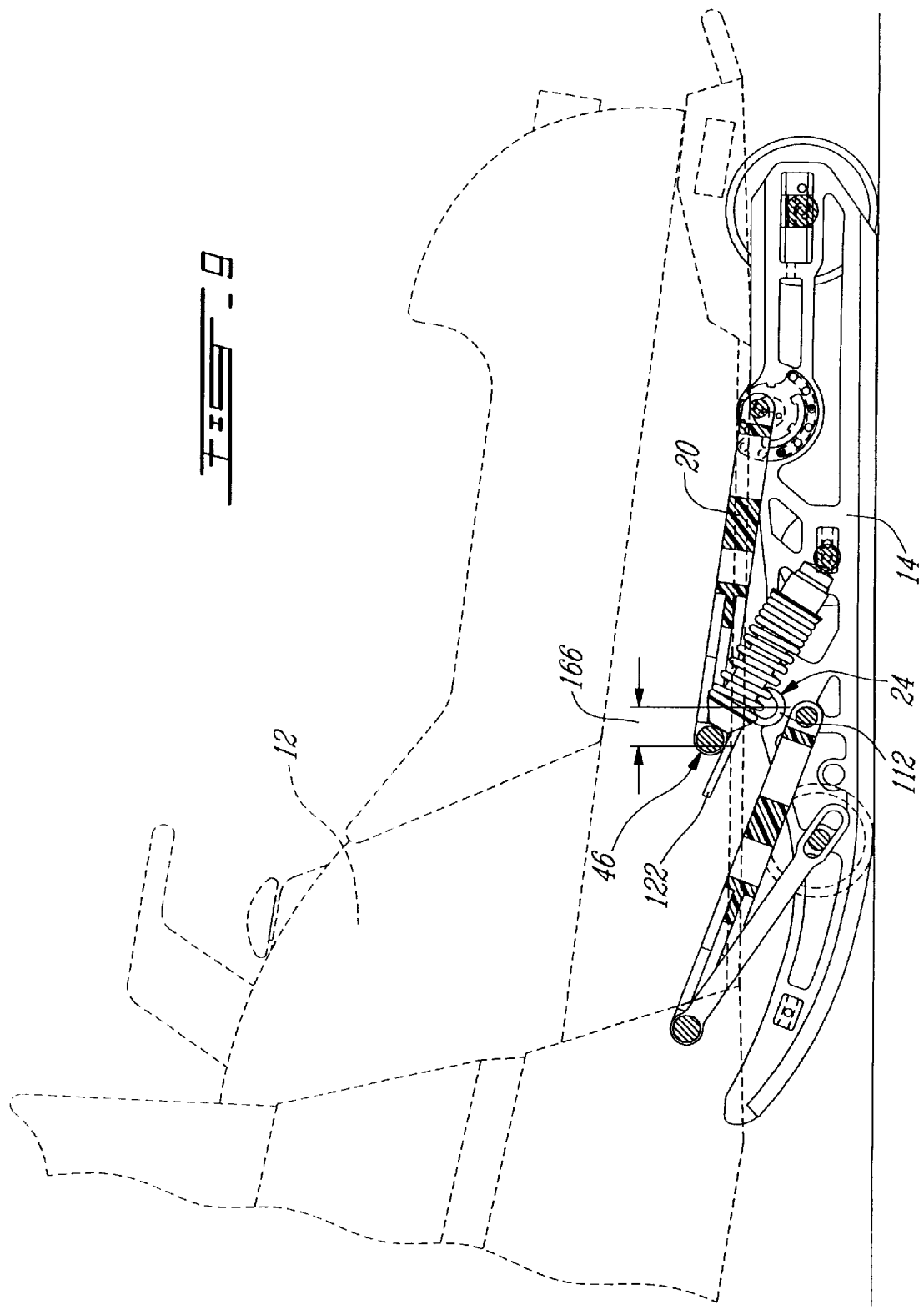

SNOWMOBILE SUSPENSION SYSTEM

FIELD OF THE INVENTION

The present invention relates to suspension systems. More specifically, the present invention is concerned with a snowmobile suspension system.

BACKGROUND OF THE INVENTION

It is well known in the art to suspend the drive belt of a snowmobile below the body thereof for suspension movements.

These suspension systems are usually provided with a pair of side rails to guide the drive belt, a pair of suspension arms each having a proximate end pivotally mounted to the snowmobile and a distal end pivotally mounted to both side rails. The side rails, suspension arms and the snowmobile are so configured as to form a deformable parallelogram, thereby allowing suspension movements of the side rails with respect to the snowmobile between a fully extended and a fully retracted position. Shock absorbers and compression springs are also provided between the side rails and the snowmobile to bias the side rails towards their extended position.

Such conventional snowmobile suspension systems suffer from many drawbacks. A first drawback relates to the material used to make the side rails. Indeed, side rails are usually made of aluminum which yields relatively heavy and complicated to manufacture side rails. Furthermore, aluminum side rails have other drawbacks related to the nature of the material such as, for example, poor resistance toughness and low fatigue life.

A second drawback of the conventional snowmobile suspension systems is revealed when a force, overcoming the forces applied by the shock absorbers and the springs, causes the side rails to go from their fully extended position to their fully retracted position. When this is the case, the side rails will hit the underside of the snowmobile, which may damage the vehicle and/or endanger the driver.

To overcome this drawback, commercially available snowmobile suspension systems are provided with a piece of resilient material, for example, rubber, strategically positioned to intercept the side rails before they contact the underside of the snowmobile. The contact is therefore much less violent since the resilient material absorbs a portion of the energy of the impact. However, the contact between the side rails and the rubber piece still causes undesired sensations to the driver.

A third drawback is the lack of adjustability of the suspension characteristics or the complexity of adjustment of these characteristics. Indeed, conventionally, the pivotal attachments securing the distal end of the rear suspension arm to the side rails and the shock absorbers to the side rails are at predetermined fixed positions which results, for a given configuration, in predetermined suspension characteristics. This is a drawback since it removes the possibility for the driver to select different suspension characteristics for different type of rides.

To address this problem, many adjustable snowmobile suspension systems have been proposed. For example, U.S. Pat. No 5,692,579 issued on Dec. 2, 1997, naming Keith W. Peppel et al. as inventors and entitled "Adjustable Snowmobile Track Suspension" discloses a system provided with a rear suspension arm having a distal end which is so mounted to the side rails that limited longitudinal movements of the distal end may be achieved. The systems also include adjustable limits allowing the characteristics of the suspension to be adjusted by the user.

While Peppel's suspension is an improvement in terms of adjustability, it involves many mechanical elements to allow the longitudinal movements and to limit these movements. Furthermore, the user needs some tools to loose the fasteners, rotate the rectangular limits and to tighten the fasteners.

OBJECTS OF THE INVENTION

An object of the present invention is therefore to provide an improved snowmobile suspension system.

SUMMARY OF THE INVENTION

More specifically, in accordance with the present invention, there is provided a snowmobile suspension system configured to suspend a drive track to a snowmobile; the suspension system comprising:

a front suspension arm having a proximate end pivotally mounted to the snowmobile; the front suspension arm having a distal end;

a rear suspension arm having a proximate end pivotally mounted to the snowmobile; the rear suspension arm having a distal end;

a pair of side rails; each side rail being pivotally mounted to the distal ends of the front and rear suspensions for suspension movements between a retracted position where the side rails are adjacent to the snowmobile and an extended position; each side rail being made of composite material and provided with a concave undersurface; and a biasing assembly pivotally mounted to the snowmobile and to both side rails; the biasing assembly biasing both side rails towards the extended position.

According to a second aspect of the present invention, there is provided a a snowmobile suspension system configured to suspend a drive track to a snowmobile; the suspension system comprising:

a front suspension arm having a proximate end pivotally mounted to the snowmobile; the front suspension arm having a distal end;

a rear suspension arm having a proximate end pivotally mounted to the snowmobile; the rear suspension arm having a distal end;

a pair of side rails; each side rail being pivotally mounted to the distal ends of the front and rear suspensions for suspension movements between a retracted position where the side rails are adjacent to the snowmobile and an extended position;

a biasing assembly pivotally mounted to the snowmobile and to both side rails; said biasing assembly biasing both side rails towards the extended position; and a progressive spring assembly so mounted to the pair of side rails as to contact at least one of the front and rear suspension arms when the pair of side rails nears the retracted position thereby absorbing excess energy from the side rails to prevent forceful contact between the side rails and the snowmobile.

According to a third aspect of the present invention, there is provided a a snowmobile suspension system configured to suspend a drive track to a snowmobile; the suspension system comprising:

a front suspension arm having a proximate end pivotally mounted to the snowmobile; the front suspension arm having a distal end;

a rear suspension arm having a proximate end pivotally mounted to the snowmobile; the rear suspension arm having a distal end;

first and second longitudinal side rails; each longitudinal side rail being pivotally mounted to the distal end of the front suspension arm; each longitudinal side rail having a generally transversal rear pivot axis and a semi-circular channel coaxial with the rear pivot axis; the semi-circular channel having opposite ends;

a linkage assembly connecting the distal end of the rear suspension arm to the pair of side rails; the linkage assembly including, for each side rail:

an adjustable cam assembly so mounted to the side rail as to pivot about the rear pivotal axis; the cam assembly having an off-center arm mounting aperture to which the distal end of the rear suspension arm is pivotally mounted; and at least one adjustable abutment element so mounted to the cam assembly as to extend in the semi-circular channel; the abutment element limiting the pivoting movements of the cam assembly by abutting the ends of the semi-circular channel; and a biasing assembly pivotally mounted to the snowmobile and to both side rails; the biasing assembly biasing both side rails towards an extended position.

Other objects, advantages and features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 1 is a sectional side elevational view illustrating a snowmobile suspension system according to an embodiment of the present invention; the snowmobile suspension system being shown mounted to a snowmobile;

FIG. 2 is a sectional side elevational view of the snowmobile suspension system of FIG. 1;

FIG. 3 is a side elevational view of one of the side rails of the snowmobile suspension system of FIG. 1;

FIG. 4 is a plan view taken along line 44 of FIG. 1;

FIG. 5 is a side elevational view illustrating the snowmobile suspension system of FIG. 1 in a resting state;

FIG. 7 is a side elevational view illustrating the snowmobile suspension system of FIG. 1 when the snowmobile is under a strong acceleration;

FIG. 8 is a side elevational view illustrating the snowmobile suspension system of FIG. 1 when the front portion of the suspension system hits a bump; and FIG. 9 is a side elevational view illustrating the snowmobile suspension system of FIG. 1 in a retracted position.

DESCRIPTION OF THE PREFERRED EMBODIMENT

Figure 6:
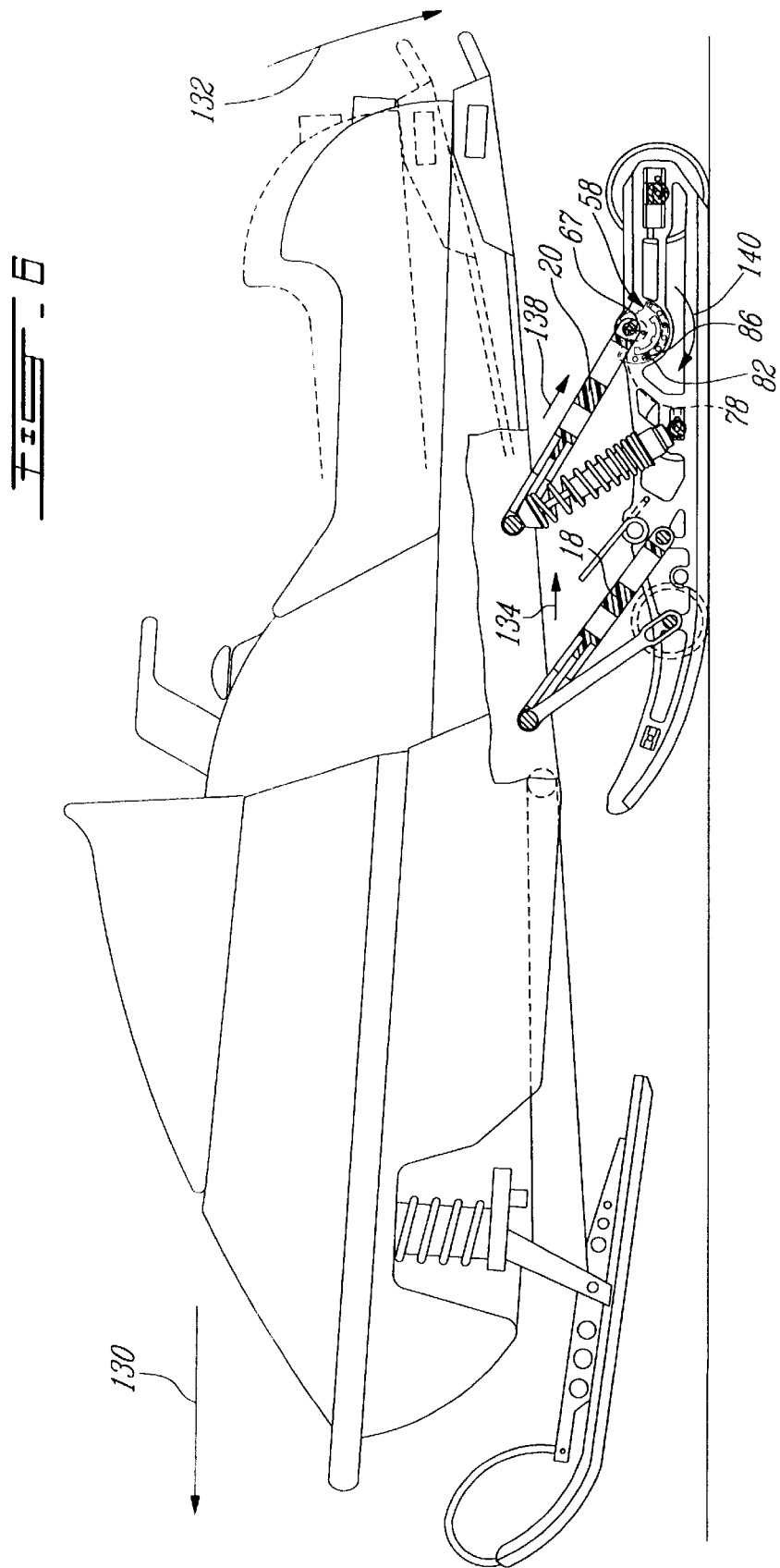
FIG. 6 is a side elevational view illustrating the snowmobile suspension system of FIG. 1 when the snowmobile is under a normal acceleration.

Turning now to FIGS. 1 to 4 of the appended drawings, a snowmobile suspension system 10 according to an embodiment of the present invention will be described.

In FIG. 1, the snowmobile suspension system 10 is illustrated suspended from the underside of a snowmobile 12. As will be described hereinbelow, the snowmobile suspension system 10 may move from a fully extended position to a fully retracted position.

As can be better seen from FIG. 2, the snowmobile suspension system 10 is provided with a pair of side rails 14 and 16 (only one shown) to guide a drive belt (not shown), front and rear identical suspension arms 18 and 20, a biasing assembly 22 and a progressive spring assembly 24.

The side rails 14 and 16 are identical. They are advantageously made of a Ultra-High Molecular Weight (UHMW) material such as, for example, Ultra-High Molecular Weight Polyethylene (UHMW-PE) manufactured under the tradename Tivar® 1000 by Poly Hi Solidur, a division of Menasha Corporation.

Since the side rails 14 and 16 are made of a polymeric material, they are advantageously provided with a concave undersurface (see undersurface 26 in FIG. 3). Therefore, when pressure is applied in the direction of arrow 28, the side rails 14 and 16 will have the tendency to flatten to therefore present a generally flat undersurface and increase the stiffness of the side rails. It has been found that when Tivar® 1000 is used, a side rail 14 of about 46 inches (about 1.17 meters) operates in a satisfactory manner when the undersurface 26 is generally semicircular and has a radius of about 400 inches (about 10.16 meters). Of course, the above measurements are given as an example only and depend, amongst others, on the shape of the rails, the type of material used and the type of snowmobile used.

Another way of looking at the undersurface 26 of the rail 14 is that it presents an inward central deflection of about ¼ of an inch (about 0.006 meters). Of course, the undersurface 26 could present another profile, as long as the undersurface is not straight. For example, 2 straight surfaces (not shown) could be joined to present a central deflection of about ¼ inch.

As will be apparent to one skilled in the art, the term "concave", as used in the present description and in the appended claims, is to be construed as meaning any surface that presents an inward deflection, not necessarily semi-circular in shape.

The rail 14 includes a plurality of thinner portions 29 so configured, sized and positioned as to decrease the overall weight of the rail 14 without significantly decreasing its stiffness.

It has been found that rails following the shape illustrated in the appended figures, when made of Tivar® 1000, offer similar performances as conventional aluminum rails while being lighter and free of the above-noted drawbacks of conventional aluminum side rails. The weight required to flatten the undersurface 26 of the rails described hereinabove is about 500 pounds (about 227 kg).

The front and rear suspension arms 18 and 20 define, with the side rails 14 and 16 and with the underside of the snowmobile 12, a parallelogram, allowing suspension movements of the side rails 14 and 16 with respect to the snowmobile between fully extended and fully retracted positions.

The front suspension arm 18 is generally Y-shaped (see FIG. 4) and includes a proximate portion 30 provided with a cylindrical mounting rod 32 having opposite projections 34 and 36 configured and sized to be pivotally mounted to corresponding cylindrical apertures (not shown) of the snowmobile. The front suspension arm 18 also includes a distal portion 38 provided with a cylindrical mounting rod 40 having opposite projections 42 and 44 configured and sized to be pivotally mounted to corresponding cylindrical apertures of respective side rails 14 and 16.

Similarly, the rear suspension arm 20 is generally Y-shaped (see FIG. 4) and includes a proximate portion 46 provided with a cylindrical mounting rod 48 having opposite projections 50 and 52 configured and sized to be pivotally mounted to corresponding cylindrical apertures (not shown) of the snowmobile. The rear suspension arm 20 also includes a distal portion 54 provided with a cylindrical mounting rod 56. The mounting rod 56 is pivotally mounted to both side rails 14 and 16 via identical adjustable cam assemblies 58, 60. For concision purposes, only the adjustable cam assembly 58 will be described hereinbelow.

It is to be noted that since the front and rear suspension arms 18 and 20 are advantageously made of Tivar® 1000, which is a self-lubricating material having a low coefficient of friction, other friction reducing material is not required between the mounting rods 32, 40 and the front suspension arm 18 and between the mounting rods 48, 56 and the rear suspension arm 20.

The adjustable cam assembly 58 includes first and second semi-circular disks 62, 64 so mounted to an aperture 66 (FIG. 3) of the side rail 14 as to pivot about a central first pivotal axis 67. The semi-circular disks are interconnected via a fastener 68 and may include cylindrical projecting portions (not shown) configured and sized to enter the aperture 66. Again, since Tivar® 1000 is a self-lubricating material having a low coefficient of friction, other friction reducing material is not required between the projection and the aperture 66.

Each semi-circular disk 62 and 64 includes a series of circular apertures 70*a*–70*h* equidistant from the first pivotal axis 67. The apertures 70*a*–70*h* are therefore positioned on an hypothetical semicircular line.

Each disk 62 and 64 also includes an offset mounting aperture 72 to which the distal end 54 of the rear suspension arm 20 may be pivotally mounted. As can be better seen from FIG. 4, the mounting rod 56 is mounted to the adjustable cam assemblies 58 and 60 via fasteners 74, 76 so as to pivot about a second pivotal axis 78.

Returning to FIG. 3, the side rail 14 is provided with a semi-circular slot 80 aligned with the hypothetical semicircular line defined by the apertures 70*a*–70*h*. The slot 80 has a front end 82 and a rear end 84 (see FIG. 3) and allows a front adjusting pin 86 and a rear adjusting pin 88 to be inserted in respective apertures 70*a*–70*h* of both disks 62 and 64 while extending through the slot 80. As will be further described hereinbelow, the adjusting pins 86 and 88 respectively limit the pivotal movement of the adjustable cam assembly 58 in clockwise and counterclockwise directions, since the adjustable cam assembly 58 may not pivot further when one of the adjusting pin contacts one of the ends of the slot. Advantageously, the front adjusting pin 86 is inserted in one of the first five apertures 70*a*–70*e*, while the rear adjusting pin 88 is inserted in one of the last three apertures 70*f*–70*h*.

The biasing assembly 22 includes a pair of shock absorbers 90, 92 each having a proximate end mounted to the mounting rod 48 of the rear suspension arm 20 and a distal end mounted to an adjustable spacer rod 94. The spacer rod 94 is slidably mounted in a rectangular aperture 96 of the rails (see FIG. 3) thereby allowing limited longitudinal adjustment of the mounting position of the distal end of the shock absorbers 90, 92. The biasing assembly 22 also includes compression springs 98, 100 conventionally provided around the shock absorbers 90, 92, respectively.

Of course, the biasing assembly 22 is provided between the side rails and the snowmobile to bias the side rails towards their extended position.

As will be apparent to one skilled in the art, the longitudinal adjustment of the spacer rod 94 enables the user to modify the stiffness of the biasing assembly 22.

The snowmobile suspension system 10 also includes a slide bar 102 having a proximate end 104 pivotally mounted to the mounting rod 32 of the front suspension arm 18 and a distal end 106 provided with an elongated slot 108 mounted to a spacer rod 110 interconnecting the side rails 14 and 16. Of course, as will be apparent to one skilled in the art, the purpose of the slide bar 102 is to limit the opening of the front suspension arm 18.

The progressive spring assembly 24 includes two separate springs 112 and 114 having a rising strength rate. Each spring is mounted in a semicircular opening 116 of the rails (see FIG. 3) and includes a generally L-shaped leg 118 inserted in an aperture 120 of the rails to prevent rotation of the spring in the semi-circular opening 116. Each spring also includes a generally straight contact portion 122 so positioned, configured and sized as to contact the rear suspension arm 20 when the snowmobile suspension system 10 is near its fully retracted position. The purpose of the progressive spring assembly 24 is to prevent forceful contact between the elements of the snowmobile suspension system 10 and the underside of the snowmobile 12 by progressively absorbing energy as the snowmobile suspension system 10 nears its fully retracted position. This energy absorption will slow the movement of the snowmobile suspension system 10, therefore minimizing the chances of contact.

It is to be noted that the snowmobile suspension system 10 includes other elements that are not relevant to the present invention, such as, for example, spacer rods 124 and endless track contacting wheels 126. These elements will not be further discussed herein since they are believed well known to one skilled in the art.

Turning now more specifically to FIGS. 5–9 of the appended drawings, the operation of the snowmobile suspension system 10 according to an embodiment of the present invention will be described.

FIG. 5 illustrates the snowmobile suspension system 10 mounted to the snowmobile 12 when the snowmobile suspension system is in a resting state. Therefore, only the weight of the snowmobile 12 and of the user (not shown) applied downward pressure onto the snowmobile suspension system 10 which is thus in its fully extended operating position.

It is to be noted that when the snowmobile suspension system 10 is in this position, the rear adjusting pin 88, which is inserted in the aperture 70*f*, abuts the rear end 84 of the slot 80. The cam assembly 58 has therefore pivoted about axis 67 (see arrow 128) with respect to the position of the snowmobile suspension system 10 shown in FIG. 2. However, even if more weight is applied to the snowmobile suspension system 10, there will be no further counterclockwise rotation of the cam assembly 58 since there is contact between the rear adjusting pin 88 and the rear end 84 of the slot 80. Therefore, if more weight is applied to the snowmobile suspension system 10, the parallelogram defined by the underside of the snowmobile 12, the suspension arms 18 and 20, and the rail 14 will flatten.

It is to be noted that if the rear adjustment pin 88 had been inserted in one of the aperture 70*g* or 70*h*, the position of the snowmobile 12 at its resting state would have been different from the one illustrated in FIG. 5. Indeed, since the weight of the snowmobile is sufficient to ensure that the rear adjustment pin 88 contacts the rear end 84 of the slot 80, the insertion of the adjustment pin 88 in another aperture change the dynamic of the snowmobile suspension system 10. More specifically, when the adjustment pin 88 is inserted in the aperture 70h the ride is smoother than if the adjustment pin 88 is inserted in the aperture 70f since the insertion in aperture 70h causes a pre-pivoting action of the cam assembly 58, therefore shortening the effective length of the rear suspension arm 20 which, as will be described hereinafter, increases the pulling action (see arrow 160 in FIG. 8) when the snowmobile hits a bump.

Turning now to FIG. 6 of the appended drawings, the operation of snowmobile suspension system 10 when the snowmobile 12 is under normal forward acceleration (see arrow 130) will be described. When this is the case, the front portion of the snowmobile 12 is lifted from the ground while the rear portion of the snowmobile 12 drops towards the ground (see arrow 132). The acceleration forces cause a downward force on the rear suspension arm 20 (se arrows 134 and 138) that cause the clockwise rotation (see arrow 140) of the cam assembly 58 about pivot axis 67. This clockwise rotation causes the rearward displacement of the pivotal axis 78 therefore modifying the shape of the parallelogram defined by the front and rear suspension arms 18 and 20, the side rails 14 and 16 and the underside of the snowmobile 12. Hence, the downward movement of the rear portion of the snowmobile 12 has been absorbed by the pivotal movement of the cam assembly 58 without requiring any movement of the front suspension arm.

It is to be noted that the front adjustment pin 86 does not contact the front end 82 of the slot 80. Once this contact is made, further increase in acceleration is translated in a general movement of the snowmobile suspension system 10 towards its retracted position. Indeed, if the pin 86 contacts the end 82, further pivotal movement of the rear suspension arm 20 about axis 67 is prevented, thus forcing the pivotal movement of the rear suspension arm 20 about pivotal axis 78.

It is also to be noted that when the adjustment pin 86 contacts the front end 82 of the slot 80, further increase in acceleration does not cause further upward movement of the front portion of the snowmobile 12 but cause only further downward movement of the rear portion of the snowmobile 12.

In FIG. 7, the front adjustment pin is shown inserted in aperture 70e while the snowmobile is shown under strong acceleration (see arrow 142). Again, the front portion of the snowmobile 12 is lifted from the ground while the rear portion of the snowmobile 12 drops towards the ground (see arrow 144).

Under a strong acceleration, the force on the snowmobile suspension system 10 (see arrow 146) will cause the pivoting action of the distal ends of the suspension arms (see arrows 148 and 150, respectively) to thereby move the snowmobile suspension system 10 towards its retracted position.

It is to be noted that the undersurface 26 of the rail 14 has lost its deflection since the load transferred to the rail 14 by the biasing assembly is great.

It is also to be noted that when the adjustment pin 86 is inserted in the aperture 70e the weight shift effect is greater than if the adjustment pin 86 is inserted in the aperture 70a since the insertion in aperture 70e allows a greater upward movement of the front portion of the snowmobile 12 than would the insertion in aperture 70a.

FIG. 8 of the appended drawings illustrates the front portion of the rail 14 moved upwardly (see arrow 152) by a bump 154 during forward movement of the snowmobile 12 (see arrow 156). When this is the case, the rail 14 is moved rearwardly (see arrow 158), thereby causing the rear arm 20 to be pulled (see arrow 160), that, in turn causes the rear portion of the snowmobile 12 to be moved downward (see arrow 162). Of course, since the adjustment pin 88 abuts the rear end 84 of the slot 80, the pulling action (arrow 160) will cause the counterclockwise pivotal movement of the distal end of the rear arm 20 about pivotal axis 78.

Finally, turning to FIG. 9 of the appended drawings, the operation of the progressive spring assembly 24 will be briefly described. As can be seen from this figure, the proximate portion 46 of the rear suspension arm 20 contacts and compresses the contact portion 122 of the spring 112 to absorb energy from the movement of the snowmobile suspension system 10 towards its retracted position to eventually stop this movement before the snowmobile suspension system 10 reaches its fully retracted position.

As will be apparent to one skilled in the art, (a) since the distance 166 between the point of contact of the arm 20 and the spring 112 and the center of the spring 112 decreases as the snowmobile suspension system 10 moves towards its fully retracted position, and (b) since the torsion of the spring 112 increases as the above-noted distance decreases, the strength of the spring 112 increases progressively as the snowmobile suspension system 10 nears its fully retracted position.

It is to be noted that, in FIG. 9, the undersurface 26 of the side rail 14 does not present a concave profile since the downward force applied by the snowmobile is sufficient to temporarily deform the side rails.

Although the present invention has been described hereinabove by way of preferred embodiments thereof, it can be modified, without departing from the spirit and nature of the subject invention as defined in the appended claims.

What is claimed is:

1. A snowmobile suspension system configured to suspend a drive track to a snowmobile; said suspension system comprising:

a front suspension arm having a proximate end pivotally mounted to the snowmobile; said front suspension arm having a distal end;

a rear suspension arm having a proximate end pivotally mounted to the snowmobile; said rear suspension arm having a distal end;

a pair of side rails; each side rail being pivotally mounted to said distal ends of said front and rear suspensions for suspension movements between a retracted position where the side rails are adjacent to the snowmobile and an extended position;

a biasing assembly pivotally mounted to the snowmobile and to both said side rails; said biasing assembly biasing both said side rails towards said extended position; and a progressive spring assembly so mounted to said pair of side rails as to contact at least one of said front and rear suspension arms when said pair of side rails nears said retracted position thereby absorbing excess energy from said side rails to prevent forceful contact between the side rails and the snowmobile.

2. A snowmobile suspension system as recited in claim 1, wherein said progressive spring assembly is so mounted to said pair of side rails as to contact said rear suspension arm when said pair of side rails nears said retracted position.

3. A snowmobile suspension system as recited in claim 1, wherein said progressive spring assembly includes a first progressive spring element mounted to one of said side rails and a second progressive spring element mounted to the other of said side rails.

4. A snowmobile suspension system as recited in claim 1, wherein said longitudinally concave undersurface presents a maximum deflection of about ¼ of an inch.

5. A snowmobile suspension system as recited in claim 4, wherein each of said progressive spring also includes a straight leg configured and sized to contact said rear suspension arm when said pair of side rails nears said retracted position.

6. A snowmobile suspension system as recited in claim 1, wherein said front and rear suspension arms are made of a composite material.

7. A snowmobile suspension system as recited in claim 6, wherein said composite material contains Ultra High Molecular Weight Polyethylene (UHMW-PE).

8. A snowmobile suspension system configured to suspend a drive track to a snowmobile; said suspension system comprising:

a front suspension arm having a proximate end pivotally mounted to the snowmobile; said front suspension arm having a distal end;

a rear suspension arm having a proximate end pivotally mounted to the snowmobile; said rear suspension arm having a distal end;

first and second longitudinal side rails; each longitudinal side rail being pivotally mounted to said distal end of said front suspension arm; each longitudinal side rail having a generally transversal rear pivotal axis and a semi-circular channel coaxial with said rear pivotal axis; said semi-circular channel having opposite ends;

a linkage assembly connecting said distal end of said rear suspension arm to said pair of side rails; said linkage assembly including, for each of said pair of side rails:

an adjustable cam assembly so mounted to said side rail as to pivot about said rear pivotal axis; said cam assembly having an off-center arm mounting aperture to which said distal end of said rear suspension arm is pivotally mounted; and at least one adjustable abutment element so mounted to said cam assembly as to extend in said semi-circular channel; said abutment element limiting the pivotal movements of said cam assembly by abutting said ends of said semi-circular channel; and a biasing assembly pivotally mounted to the snowmobile and to both said side rails; said biasing assembly biasing both said side rails towards an extended position.

9. A snowmobile suspension system as recited in claim 8, wherein each said adjustable cam assembly includes first and second semi-circular disks so mounted to opposite lateral sides of said longitudinal side rails as to pivot about said generally transversal rear pivotal axis.

10. A snowmobile suspension system as recited in claim 9, wherein each said semi-circular disks includes at least two apertures aligned with said semi-circular channel, and wherein said at least one adjustment element includes at least one adjustment pin configured and sized to be inserted in said apertures of said disks while extending in said semi-circular channel.

11. A snowmobile suspension system as recited in claim 10, wherein said at least two apertures include seven apertures and wherein said at least one adjustment pin includes two adjustment pins.

12. A snowmobile suspension system as recited in claim 8, wherein said front and rear suspension arms are made of a composite material.

13. A snowmobile suspension system as recited in claim 12, wherein said composite material contains Ultra High Molecular Weight Polyethylene (UHMW-PE).

* * * * *